(12) United States Patent
Krautkraemer (10) Patent No.: US 12,528,625 B2
(45) Date of Patent: Jan. 20, 2026

(54) SAFETY CLOSING DEVICE

(71) Applicant: BASF SE, Ludwigshafen am Rhein (DE)

(72) Inventor: Christian Krautkraemer, Eltville (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/572,522

(22) PCT Filed: Jul. 22, 2022

(86) PCT No.: PCT/EP2022/070653
§ 371 (c)(1),
(2) Date: Dec. 20, 2023

(87) PCT Pub. No.: WO2023/002029
PCT Pub. Date: Jan. 26, 2023

(65) Prior Publication Data
US 2024/0367871 A1  Nov. 7, 2024

(30) Foreign Application Priority Data

Jul. 22, 2021 (DE) .......................... 102021119064.9

(51) Int. Cl.
*B65D 47/12* (2006.01)
*B65D 41/04* (2006.01)

(52) U.S. Cl.
CPC ....... *B65D 47/121* (2013.01); *B65D 41/0457* (2013.01)

(58) Field of Classification Search
CPC ............. B65D 47/121; B65D 41/0457; B65D 47/283; B65D 2251/0012; B65D 2251/0043; B65D 2251/0078; B65D 2401/20; B65D 47/12; B65D 47/28; B67D 7/02
See application file for complete search history.

(56) References Cited

U.S. PATENT DOCUMENTS

| | | | |
|---|---|---|---|
| 4,683,016 A | 7/1987 | Dutt et al. | |
| 8,292,101 B1 | 10/2012 | Bragg et al. | |
| 9,434,516 B2 | 9/2016 | Johnson | |
| 2011/0042421 A1 | 2/2011 | Smith et al. | |
| 2011/0163103 A1* | 7/2011 | Lee ................... | B65D 51/2864 220/521 |

(Continued)

FOREIGN PATENT DOCUMENTS

| | | |
|---|---|---|
| CA | 2291491 A1 | 12/1999 |
| CA | 2406805 A1 | 10/2002 |

(Continued)

OTHER PUBLICATIONS

International Search Report and Written Opinion for corresponding PCT/EP22/70653, mailed Nov. 14, 2022, 11 pages.

*Primary Examiner* — Shawn M Braden
(74) *Attorney, Agent, or Firm* — Armstrong Teasdale LLP (57) ABSTRACT

Described herein is a closing device including a closing element, a sealing element and a closing cap. The closing element is connectable at least form-fitted or force-fitted with a neck of a container. The closing device can be brought in a closed state, in which the closing cap closes output opening, and can be brought in an opened state, in which the output opening is released.

19 Claims, 6 Drawing Sheets

(56) References Cited

U.S. PATENT DOCUMENTS

| | | | |
|---|---|---|---|
| 2016/0264319 A1* | 9/2016 | Johnson | B67D 3/045 |
| 2017/0050775 A1* | 2/2017 | Sanbar | B65D 47/248 |
| 2018/0162610 A1* | 6/2018 | Kim | B65D 51/18 |
| 2019/0092538 A1* | 3/2019 | Johnson | B65D 47/121 |
| 2019/0344938 A1 | 11/2019 | Lebon | |
| 2020/0239203 A1* | 7/2020 | Rognard | B65D 47/08 |

FOREIGN PATENT DOCUMENTS

| | | |
|---|---|---|
| DE | 4017241 A1 | 12/1991 |
| EP | 0269499 A1 | 6/1988 |
| EP | 3500518 B1 | 10/2020 |
| WO | 2018034567 A1 | 2/2018 |

* cited by examiner

SAFETY CLOSING DEVICE

CROSS-REFERENCE TO RELATED APPLICATIONS

This application is a U.S. National Phase Application of International Patent Application No. PCT/EP22/70653, filed Jul. 22, 2022, which claims priority to DE Patent Application No. 102021119064.9, filed Jul. 22, 2021, each of which is hereby incorporated by reference herein.

The present invention relates to a closing device comprising a closing element, a sealing element and a closing cap, wherein the closing element comprises a fluid channel having an input opening and an output opening, wherein the fluid channel is aligned along a closing axis, wherein the closing element comprises a first fastener, wherein the first fastener is configured and arranged in such a manner, that the closing element is connectable at least form-fitted or force fitted with a neck of a container, such that a filling material inside the container is guidable into the fluid channel through the input opening, wherein the closing element comprises a receiving arrangement for receiving the sealing element, wherein the receiving arrangement comprises a latching nose projecting to the closing axis or a latching recess directed away from the closing axis for at least form-fit or force-fit connecting of the closing element with the sealing element, wherein the closing element and the sealing element are configured in such a manner, that in a sealed state of the closing device the sealing element is engaged with the receiving arrangement and the sealing element seals the fluid channel at least liquid-tight, and in an unsealed state of the closing device, the sealing element is disengaged with the receiving arrangement, wherein the closing element and the closing cap are configured and arranged in such a manner, that the closing device can be brought in a closed state, in which the closing cap closes the output opening, and can be brought in a opened state, in which the output opening is released.

Such a closing element is known from WO 2018/034567 A1.

Closures of this kind are applied in containers, which are used for the transport and the storage of agrochemicals. Some agrochemicals can cause irritations or chemical burn in case of skin contact or have an environmentally harmful effect, if they are released into the environment in an uncontrolled manner and in excessive doses.

For transporting and storing such chemicals, it is desirable that the used closing systems should be configured in such a manner, that they minimize the risk of a direct contact of the user with the chemical product or minimize an uncontrollable leakage of the chemical product.

With the closing device, referred to at the beginning, container comprising agrochemicals can be closed riskless to a certain extent. For unsealing such a closing device equipped with a sealing element the user uses an opening connecting piece. This has to—as described in WO 2018/034567 A1—be used for detaching the sealing element from the closing element such that even a free access can be provided to the inside of the container.

It has been shown, that with the known closing devices the connection between the sealing element and the closing element is not sufficiently tight, such that also during the transport or during the storage of the container, when the sealing element is still connected with the closing element, the risk exists that agrochemicals can be escape uncontrolled.

It is therefore an object of the present invention to provide for a closing device, which comprises a sufficiently tight connection between the closing element and the sealing element.

This object is solved by a closing device as referred to at the beginning.

According to an embodiment of the invention, a sealing protrusion is located at least at one of the receiving arrangement, and the sealing element, wherein the sealing protrusion is arranged at a sealing area between the receiving arrangement and the sealing element, such that in a sealed state of the closing device the sealing protrusion abuts on the sealing area between the receiving arrangement and the sealing element for at least liquid-tightly sealing the fluid channel. Accordingly, the sealing protrusion can be arranged either at the sealing element or at the receiving arrangement, or at both. In the sealed state, the sealing protrusion extends at least proportionally radially to the closing axis and serves for an at least liquid tight sealing of the container in a sealed state. It has been shown, that with a closing device comprising a protrusion at the sealing element or at the receiving arrangement, or both, a tight connection between these two elements can be provided, wherein a defined pre tensioning should be remained between the sealing element and the receiving arrangement for a sufficient sealing of the closing device. In particular, the sealing protrusion reduces the surface pressure to a linear distributed load and is therefore able to balance out-of-roundness of the sealing element and/or the closing element.

In the context of the present invention, a sealing area is to be understood as an area, wherein at least two parts abut at each other in such a manner, that an at least liquid tight sealing of the closing device can be provided. In particular, the receiving arrangement and the sealing element abut at each other and form with the sealing area, an area, which is impermeable for liquids and might also be impermeable for gases.

According to an embodiment of the invention, the receiving arrangement may be formed flexible at least in sections in such a manner and the sealing element may be configured in such a manner, such that the sealing protrusion abuts in the sealed state of the closing device at the sealing area under tension. Hence, a defined pre tensioning should be remained between the sealing element and the receiving arrangement for a sufficient sealing of the closing device.

According to an embodiment of the invention, the sealing element comprises the sealing protrusion, wherein the sealing protrusion extends, projects, away from the closing axis. The sealing protrusion and the receiving arrangement may be arranged at a sealing area of the receiving arrangement, such that the sealing protrusion in the sealed state of the closing device abuts on the sealing area of the receiving arrangement for at least liquid-tight sealing the fluid channel. Accordingly, when the sealing protrusion is arranged at the sealing element, in the sealed state the sealing area is in contact with the sealing protrusion. The sealing area of the receiving arrangement is an area at the receiving arrangement which surface normal extends into the direction of the closing axis and which area is at least impermeable for liquids and might also be impermeable for gases.

It should be noted that any feature, function and/or element described in the following with reference to the protrusion at the receiving arrangement may equally apply to the protrusion at the sealing element, or vice versa.

According to one embodiment of the invention, the receiving arrangement is formed flexible at least in sections in such a manner and the sealing element is configured in such a manner, that the sealing protrusion at the sealing element extends in the sealed state to an outer radius of the sealing element, which is larger than an inner radius of the receiving arrangement, such that the sealing protrusion abuts in the sealed state of the closing device at the receiving arrangement under tension. The outer radius of the sealing element is a radius from a surface of the sealing element extending away from the closing axis. The other way around, the inner radius of the receiving arrangement, is a radius from a surface of the receiving arrangement extending into the direction of the closing axis.

According to an embodiment of the invention, the receiving arrangement comprises a sealing protrusion axially spaced apart from the latching nose or the latching recess, wherein the sealing protrusion projects into the direction of the closing axis, wherein the sealing protrusion and the sealing element are configured in such a manner, that in the sealed state of the closing device the sealing protrusion abuts on a sealing area of the sealing element for liquid-tight sealing the fluid channel. Accordingly, in the sealed state the sealing area of the sealing element is in contact with the sealing protrusion. In other words, the sealing protrusion extends at least proportionally radially to the closing axis.

If a protrusion at the sealing element and a protrusion at the receiving arrangement may be used in combination, the functions, features and/or elements described with the protrusion at the sealing element and described with the protrusion at the receiving arrangement may be applicable to this combination.

The sealing protrusion extending to the closing axis allows an effective tightening of the connection of the sealing element and the closing element.

In the context of the present invention, a closing element is to be understood as a component of a closing device.

In one embodiment of the closing device according to the invention, the closing element is configured as cylindrical closing element.

In one embodiment of the closing device according to the invention, the sealing protrusion extends over a completely cylindrical casing surface, in other words over a circumference angle of 360 degrees.

In one embodiment of the closing device according to the invention, the receiving arrangement comprises a sealing olive, wherein the sealing olive comprises the sealing protrusion. The sealing olive preferably comprises a stem section joining the sealing protrusion in the direction of the output opening, wherein the stem section comprises a lower thickness, to be measured radially to the closing axis, compared to the sealing protrusion, such that the sealing protrusion is flexibly supported with respect to the latching nose.

In one embodiment of the closing device according to the invention, the sealing protrusion comprises a substantially semicircular cross section. The plane of the cross section to be considered in this context includes the closing axis and an axis running radially from the closing axis.

It has been shown that with a sealing protrusion comprising a semicircular cross section a sufficiently good sealing can be produced. Simultaneously, the manufacturing of such a sealing protrusion is particularly simple and inexpensive.

In one embodiment of the closing device according to the invention, the sealing protrusion is configured as a sealing lip extending to the closing axis.

Such a sealing lip, which in particular can comprise a peak-shaped cross section, is particularly flexible and allows a simple insertion of the sealing element in the closing element during the assembling of the closing element and the sealing element. Simultaneously, the sealing lip seals the connection between the sealing element and the closing element sufficiently well.

In one embodiment of the closing device according to the invention, the closing element comprises an outer cylinder and an inner cylinder, wherein the inner cylinder comprises a smaller maximum inner diameter than the outer cylinder, wherein the inner cylinder is at least arranged in sections inside of a channel area surrounded by the outer cylinder, wherein the receiving arrangement is arranged at the inner cylinder.

In one embodiment of the closing device according to the invention, the inner cylinder protrudes out of the outer cylinder at the side of the closing element opposing the input opening, wherein the inner cylinder is connected with the outer cylinder via a flange, which extends radially outwards, wherein the inner cylinder defines the output opening. In this embodiment the cross section area of the output opening is preferably smaller that the cross section area of the input opening. Such a configuration allows connecting the closing element tightly with the neck of the container.

In one embodiment of the closing device according to the invention, the inner cylinder comprises a normal section and a tapering section, wherein the normal section comprises a larger inner diameter than the tapering section, wherein the tapering section is arranged closer to the input opening than the normal section, wherein the receiving arrangement is arranged at least in sections at the tapering section.

In one embodiment of the closing device according to the invention, the inner cylinder comprises at his outer casing surface, arranged inside of the fluid channel, one or a plurality of centering protrusions directed radially away from the closing axis-preferably configured as circumferential ring or circumferential rings. These radially extending centering protrusions serve for securing an automatically inserted sealing ring from falling out during the transport and the handling of the closing device und to stabilize this sealing ring during and after the application of the closing device on the neck of the container.

In one embodiment of the closing device according to the invention, the first fastener comprises an inner thread. This allows a simple and user-known connection to the neck of the container.

In one embodiment of the closing device according to the invention, the first fastener comprises a bayonet element. This allows a particularly short axial formation of the closing element.

In one embodiment of the closing device according to the invention, the receiving arrangement comprises at least a latching nose projecting to the closing axis, wherein the latching nose extends to a first inner radius and the sealing protrusion extends to a second inner radius, wherein the first inner radius is smaller than the second inner radius.

In a further alternative embodiment of the closing device according to the invention, the first inner radius is the same as the second inner radius.

In one embodiment of the closing device according to the invention, the closing element comprises a second fastener, wherein the second fastener is configured and arranged in such a manner, that the closing element is connectable form-fit or force-fit in a region of the output opening with an opening arrangement configured for separating the sealing element.

In one embodiment of the closing device according to the invention, the second fastener comprises a further latching nose extending away from the closing axis, or a further latching recess directed to the closing axis. Such a further latching nose or further latching recess allows a simple and fast connection of the closing element and the opening arrangement, which is desirable in practice.

In one embodiment of the closing device according to the invention, the receiving arrangement comprises at least a latching nose extending radially to the closing axis, wherein the latching nose of the receiving arrangement and the sealing protrusion are connected with each other via a wall section extending in axial direction, wherein the wall section comprises a lower thickness, to be measured radially to the closing axis, than the sealing protrusion, and wherein preferably the wall section comprises a lower thickness, to be measured radially to the closing axis, than the latching nose. Such a wall section having a reduced wall thickness comes along with an elastic adjustability of the sealing protrusion. This allows an elastic deformation of the sealing protrusion from the equilibrium position, when the sealing protrusion is engaged with the sealing element. This in turn is accompanied by a force due to the elastic deformation with which the sealing protrusion is pushed against a respective sealing area of the sealing element, whereby the sealing effect is increased.

In one embodiment of the closing device according to the invention, wherein the receiving arrangement comprises a latching recess radially extending away from the closing axis, wherein the latching recess of the receiving arrangement and the sealing protrusion are connected with each other via a wall section extending in axial direction, wherein the wall section comprises a lower thickness, to be measured radially to the closing axis, than the sealing protrusion.

In one embodiment of the closing device according to the invention, in the sealed state of the closing device the sealing element is arranged completely inside of the fluid channel.

In one embodiment of the closing device according to the invention, the receiving arrangement and the sealing element are configured in such a manner, that in the sealed state of the closing device the sealing element engaged with the latching nose or latching recess is only disengageable from the latching nose or the latching recess by an axial movement into the direction of the input opening for causing the unsealed state of the closing device.

In one embodiment of the closing device according to the invention, the latching nose comprises on the side facing the output opening or the latching recess on the side facing the input opening a contact area running at an angle of more than 0 degree but less than 90 degrees to the closing axis, wherein in the sealed state the sealing element abuts at the contact area.

In one embodiment of the closing device according to the invention, an imaginary extension of the contact area with the closing axis encloses an angle between 30 and 90 degrees.

It has been shown, that contact areas inclined to the closing axis in such a manner are particularly well suited for latching of the sealing element and the receiving arrangement, if the sealing element should be simultaneously configured to be removable in direction of the input opening. The contact areas thus serve as a ramp via which a correspondingly configured latching element of the sealing element can be moved for disengage the sealing element and the closing element, if a sufficiently high pressure is applied to the sealing element in the direction of the input opening.

In one embodiment of the closing device according to the invention, the receiving arrangement comprises a stop area, wherein in the sealed state the sealing element abuts or is abutable on the stop area, such that due to a movement of the sealing element in direction of the output opening a conditional separation of the sealing element and the closing element can be prevented.

In one embodiment of the closing device according to the invention, the stop area is arranged substantially vertically to the closing axis.

Such a stop area allows that the sealing element can be formed in an easy way, such that the sealing element is only movable into the direction of the input opening, for removing it from the closing element.

In one further embodiment of the closing device according to the invention, the stop area of the receiving arrangement is arranged at the end of the receiving arrangement which is nearest to the input opening and preferably at the end of the sealing protrusion which is nearest to the input opening.

In one embodiment of the closing device according to the invention, the axial portion of the surface normal of the contact area of the latching nose or the latching recess is aligned in the direction of the output opening, wherein the axial portion of the surface normal of the stop area of the receiving arrangement is aligned in the direction of the input opening.

In one embodiment of the closing device according to the invention, the sealing element comprises a cylindrical sealing area, extending over 360 degrees, wherein the sealing area of the sealing element completely abuts at the sealing protrusion of the receiving arrangement in the sealed state for closing the connecting channel liquid-tight.

In one embodiment of the closing device according to the invention, the receiving arrangement, the sealing protrusion and the sealing element are configured in such a manner, that the sealing element gas-tightly closes the fluid channel in the sealed state. This embodiment is particularly advantageous, if containers should be closed, which contain volatile agrochemicals.

In one embodiment of the closing device according to the invention, the receiving arrangement is formed flexible at least in sections in such a manner and the sealing element is configured in such a manner, that the sealing protrusion extends in the sealed state to an inner radius, which is larger as the one inner radius to which the sealing protrusion extends in the unsealed state. In this case, the effect of the force acting radially from the material deformation is utilized for preferably well sealing the connection of the sealing protrusion and the sealing element.

In one embodiment of the closing device according to the invention, the sealing element comprises a substantially circular sealing plate and at least one hook element extending in the sealed state of the closing device from the sealing plate into the direction of the output opening, wherein in the sealed state of the closing device the hook element is engaged with the latching nose or the latching recess of the closing element.

In one embodiment of the closing device according to the invention, the sealing element comprises a plurality of hook elements, which extend from the sealing plate into the direction of the output opening and which in the sealed state are engaged with the latching nose or a plurality of latching noses of the closing element.

In one embodiment of the closing device according to the invention, the sealing element and the receiving arrangement are configured in such a manner that in the sealed state of the closing device a free gap is present between the latching nose of the receiving arrangement, the sealing protrusion and the hook element of the sealing element. This free gap allows that the sealing element can be supported with a higher tension and thus with a higher sealing effect with respect to the receiving arrangement.

In one embodiment of the closing device according to the invention, the hook element comprises a connecting bar and a latching body integrally connected with the connecting bar, wherein the connecting bar is arranged at the site of the latching body facing away from the output opening, wherein the connecting bar comprises a lower thickness, to be measured radially to the closing axis, compared to the latching body. This formation goes along with an elastically variability of the hook element, which is usable for causing an easy-going latching and unlatching of the hook element and the latching nose respectively the latching recess of the receiving arrangement.

In one embodiment of the closing device according to the invention, in the closed state the closing cap is at least partially removable connected with the closing element, such that in the opened state at least a portion of the closing cap is completely separated and hence is losable from the closing device from the remaining parts of the closing device. This allows an opening of the output opening at which no parts of the closing cap, potentially disturbing the insertion of the opening arrangement, remain at the closing element.

In one embodiment of the closing device according to the invention, in the closed state of the closing device the closing cap comprises a cap lid covering the output opening and a cap casing connecting circumferentially to the cap lid, wherein the cap casing is inseparably connected with the closing element and the cap lid is at last losable connected with the cap casing via a rippable bar.

In one embodiment of the closing device according to the invention, in the closed state of the closing device the closing cap comprises a bar extending into the output opening, which in the sealed state of the closing device abuts at least in sections on the at least one hook element of the sealing element or is configured in such a manner, that the hook element butts at the bar, if the hook element performs a latching movement, such that the bar prevents a latching of the hook element and the latching nose respectively the latching recess.

In one embodiment of the closing device according to the invention, the hook element is disengaged from the latching nose or the latching recess via a movement radially directed to the closing axis. Preferably, in this embodiment, the bar of the closing cap extends in the closed and sealed state of the closing device into the fluid channel in such a manner that during a movement of the hook element radially directed to the closing axis the hook element butts at the bar of the closing cap, such that a disengagement of the hook element with the latching nose or the latching recess is prevented.

In one embodiment of the closing device according to the invention, the closing device is suitable for secured providing of a fluid connection between the inside of the container and the outside of the container, wherein the closing device additionally comprises an opening arrangement separable from the closing element, wherein the opening arrangement comprises a connecting element and a pouring spout defining a pouring channel, wherein the connecting element is engageable form-fitted or force-fitted with the closing element for connecting die opening arrangement with the closing element, wherein the opening arrangement and the closing element are configured in such a manner, that by an engaging of the opening arrangement and the closing element engaged with the pouring spout a fluid connection is providable between the inside and the outside of the container via the pouring channel of the opening arrangement, wherein the opening arrangement and the closing element are configured in such a manner, that the pouring spout is movable along the closing axis and relative to the connecting element, if the opening arrangement is connected with the closing element and the output opening is released, wherein the opening arrangement, the closing element and the sealing element are configured in such a manner, that after an axial opening movement of the pouring spout into the direction of the input opening of the closing element, the sealing element is separated from the closing element and connected with the pouring spout, such that the closing device is in the unsealed state, and a fluid connection is provided between the inside of the container and the outside of the container.

According to an embodiment of the invention, the sealing element may comprise an outer ring section extending in a direction away from the closing axis, which may comprise a U-shaped cross section, wherein the U-shaped cross section partially surrounds the receiving arrangement on the side of the input opening. In other words, the receiving arrangement is insertable into the U-shaped cross section. An end of the receiving section, which end extends into the direction of the input opening, is partially surrounded by the U-shaped cross section. The U-shaped cross section may serve for a secured placement of the receiving arrangement, such that a misalignment can be prevented. Further, the sealing properties of the closing device are improved. The U-shaped cross section might also be called a notch or a channel.

It has been shown, that a channel or notch, which is arranged circumferential at the lower end of the sealing element, the lower end extending in the direction of the input opening, provides an improved sealed connection between the sealing element and the receiving arrangement. In particular, the U-shaped cross section of the sealing element may be able to stabilize the part of the closing element, the receiving arrangement, which is part of the sealing connection. Accordingly, the closing element, in particular the receiving arrangement, may be stabilized during the assembly of the parts of the closing device. Hence, during a change of the dimensions of the sealing element and other parts of the closing device, which may be generated by swelling of these parts due to the comprised liquid in the container, the closing element may be stabilized. The notch may surround, e.g. is holding, the receiving arrangement of the closing element in contact with the sealing element, because the receiving arrangement engages with, for example, latches into, the notch.

According to an embodiment of the invention, a first part of the U-shaped cross section may extend from an lower end of the sealing element in a direction away from the closing axis and a second part of the U-shaped cross section may extend along the closing axis in the direction of the output opening for partially forming the U-shape, wherein between the first part and the second part of the U-shaped cross section a space may be formed for partially accommodating the receiving arrangement on the side of the input opening. According to this embodiment, two walls of the U-shaped cross section are described. The third part of the U-shaped cross section may be a wall of the sealing element, which extends along the closing axis into the direction of the input opening. The third part and the second part of the U-shaped cross section might be arranged parallel to each other, in particular parallel to the closing axis. Otherwise, the second and the third part might be arranged with angle with respect to the closing axis. For example, the second and the third part might be arranged in a tapering manner into the direction of the input opening. Accordingly, the smallest distance between the second and the third part of the U-shaped cross section might be at the first part, and the largest distance between the second and the third part might at the open side of the U-shaped cross section, which is the side into the direction of the output opening.

According to an embodiment of the invention, the receiving arrangement comprises a stop area which is arranged vertically to the closing axis, wherein the stop area is arranged at an end of the receiving arrangement, which end extends in to the direction of the input opening, wherein the end of the receiving arrangement comprises a first side wall and a second side wall, which both extend parallel to each other along the closing axis from the stop area into the direction of the output opening.

According to an embodiment of the invention, the closing devices further comprises a first chamfer arranged between the first side wall and the stop area, and/or further comprising a second chamfer arranged between the second side wall and the stop area. The chamfers may be used for limiting deformation and/or pressure at the U-shaped cross section such that a better sealing could be provided.

Further features, embodiments and advantages of the present invention are apparent from the Figures as described in the following. They show.

Figure 1A:
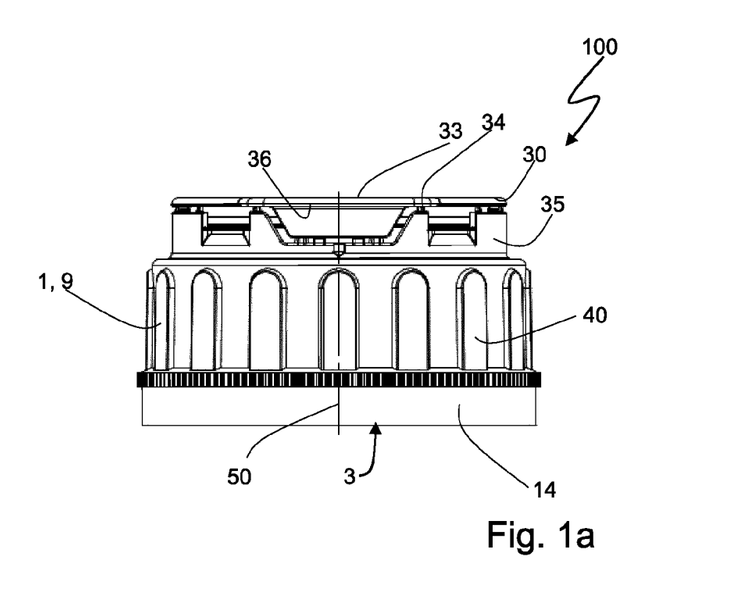
FIG. 1A a first side view of an embodiment of a closing device according to the invention, FIG. 1B a second side view of the embodiment of a closing device according to the invention of FIG. 1A, FIG. 2A a first sectional view of the embodiment of a closing device according to the invention of FIG. 1A, FIG. 2B a second sectional view of the embodiment of a closing device according to the invention of FIG. 1A, FIG. 2C a plan view of the upper side of the embodiment of a closing device according to the invention of FIG. 1A, FIG. 3 a detailed view of the receiving arrangement and the sealing element engaged with it of the embodiment of FIG. 1A, FIG. 4 a perspective view of the embodiment of a closing device according to the invention of FIG. 1A, FIG. 5 a detailed view of the embodiment of a sealing element and a receiving arrangement of a closing device according to the invention, FIG. 6 a detailed view of the embodiment of a sealing element and a receiving arrangement of a closing device according to the invention, FIG. 7 a detailed view of the embodiment of a sealing element and a receiving arrangement of a closing device according to the invention.
Figure 1B:
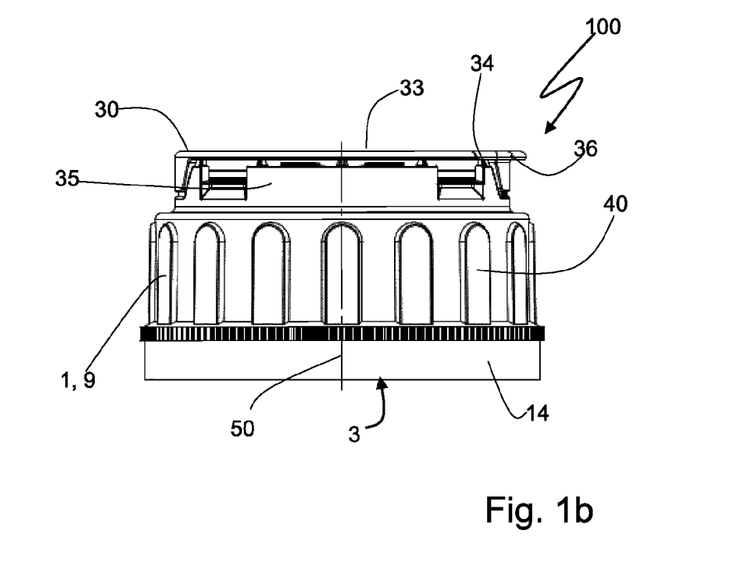
Figure 4:
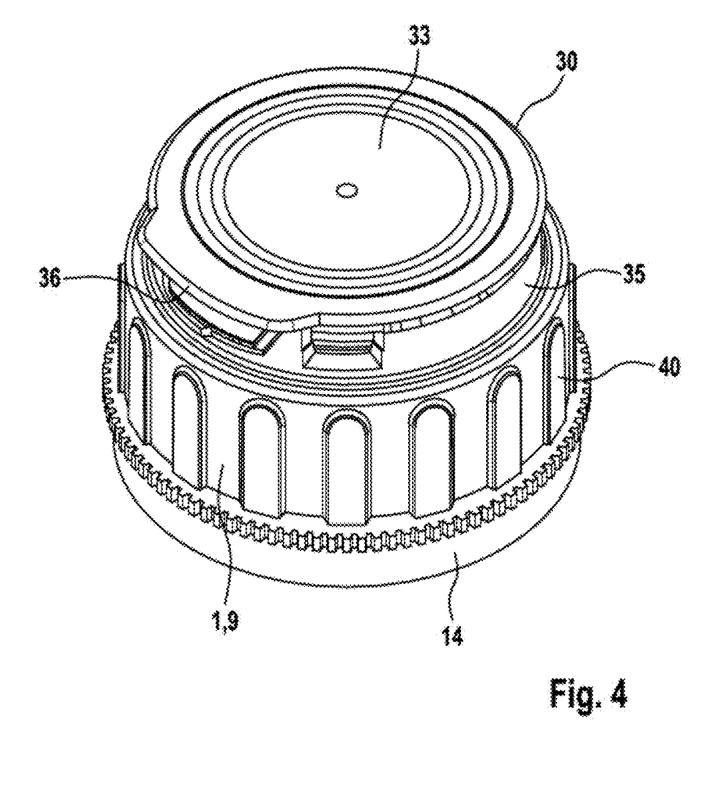

As can be seen from FIGS. 1A, 1B and 4, the embodiment of a closing device 100 according to the invention as shown in the Figures comprises a cylindrical closing element 1 having a grip riffle 40 at its outer surface. In the closed state of the closing device 100 as shown here, the closing element is closed with a closing cap 30. Thereby, the closing cap 30 is partially removably connected with the closing element 1. The closing cap 30 comprises a substantially circular cap lid 33 having an actuating flap 36 and a cap casing 35, wherein a plurality of axially extending bar portions are mounted at the cap lid, which in the closed state as shown here, are arranged in correspondingly formed recesses of the cap casing 35. The cap lid 33 and the cap casing 35 are connected with each other via multiple easily rippable bars 34, such that the cap lid 33 can be completely separated from the cap casing 35 by a lever-like movement of the actuating flap 36 for bringing the closing device 100 in the opened state, i.e., to release the output opening 4 of the closing element 1.

Figure 2A:
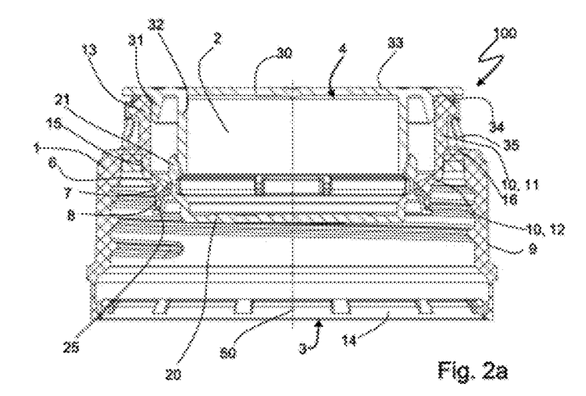
Figure 2B:
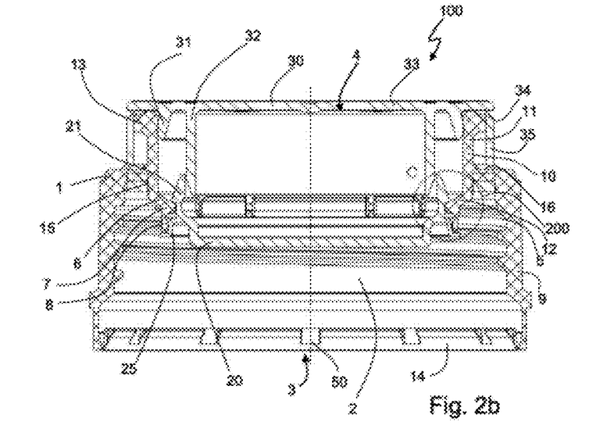
Figure 2C:
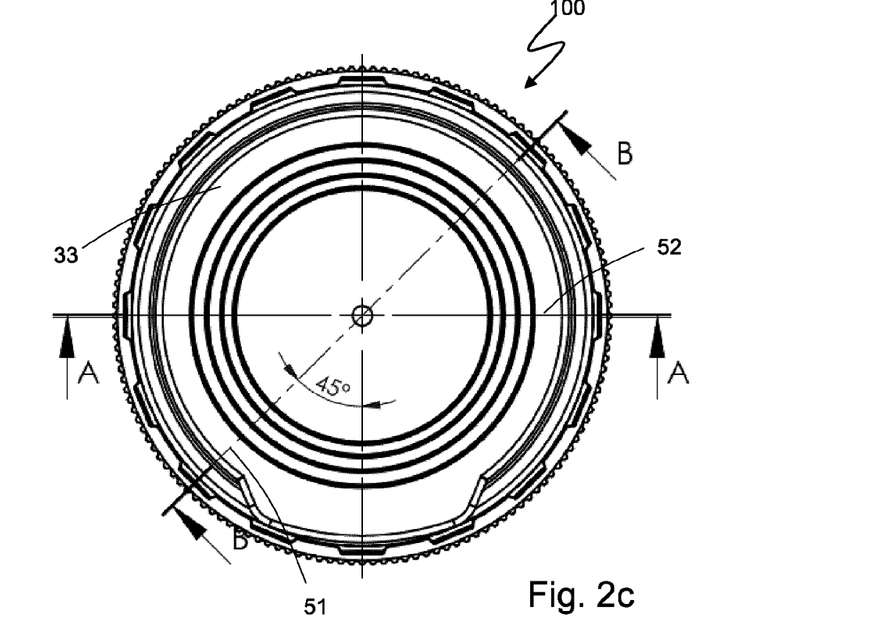

FIGS. 2A and 2B respectively show a sectional view of the embodiment of FIGS. 1A and 1B. Thereby, the sectional plane includes the closing axis 50 and respectively a spatial direction running radially to the closing axis 50. In FIG. 2C the embodiment of FIGS. 2a and 2b is shown in a plan view, wherein the sectional plane of FIG. 2A is illustrated by line B-B 51 and the sectional plane of FIG. 2B is illustrated by line A-A 52.

The closing element shown in FIGS. 2A and 2B as part of the shown closing device 100 according to the invention is comprised of an outer cylinder 9 and an inner cylinder 10, wherein the inner cylinder 10 partially extends into the outer cylinder 9. The outer cylinder comprises the first fastener 5, formed as inner thread, and defines the input opening 3 located at the bottom in this illustration. During the usage of the shown closing element 1, the outer cylinder 9 is for example engaged with a pouring spout of a container, not shown here, which comprises a respectively outer thread. The inner cylinder 10 joins the outer cylinder 9 in the direction of the output opening 4 defined by the inner cylinder 10 and is connected to it via a flange 16 formed radially to the closing axis 50. Underneath the flange 16, i.e., into the direction of the input opening 3, the tapering portion 12 of the inner cylinder 10 is arranged, which simultaneously represents the receiving arrangement 6. In this area, the diameter of the inner cylinder 10 tapers compared to the normal section 11 arranged above, i.e., aligned into the direction of the output opening 4. The normal section 11 comprises in the embodiment as shown here a substantially constant inner diameter, which only slightly enlarges near the output opening 4.

In other words, the receiving opening 6 is formed as a shoulder of the inner cylinder 10 extending radially into the inside and thereby provides a latching nose 7 extending over a circumferential angle of 360 degrees, which is suitable for receiving a hook element 21 of the sealing element 20. According to the invention a sealing protrusion 8 extending radially into the inside is formed below this latching nose 7, such that between the latching nose 7 and the sealing protrusion 8 a recess is formed, which in the embodiments as shown here comes along with a decrease of the wall thickness of the inner cylinder 10 in the area of the recess. This decreased wall thickness has the effect, that the sealing protrusion 8 formed as a part of an inwardly sealing olive comprises a radially movability, i.e., is elastically adjustable. This improves the sealing properties in cooperation with a sealing element 20, which pushes the sealing olive radially outward. The radially movability must be neither too high nor too low, such that an optimum sealing effect can be achieved.

The further latching nose, directly arranged at the output opening 4 and extending radially outward, represents the second fastener 13 and serves for connecting the closing element 1 with an opening arrangement, not shown here but known from WO 2018/034567 A1.

At its end of the closing element 1 nearest to the input opening 3 a flexible inwardly foldable strap 14 is arranged, which in interaction with rippable bars or rather a rippable weakening line forms a tamper evident ring integrally formed with the closing element 1.

This tamper evident ring indicates whether the closing element 1 after a first attachment on a pouring spout of a container has been unscrewed before. Thereby, the tamper evident ring provides an originality assurance for a closing device 100, which comprises the present closing element 1.

Further, centering protrusions 15 are visible at the outer casing surface of the inner cylinder 10, arranged inside of the fluid channel 2. These are provided for centering and fixing a sealing ring arranged inside of the gap formed between the outer cylinder 9 and the inner cylinder 10. The sealing ring serves for sealing the connection between the closing element and the neck of the container.

Furthermore, centering protrusion 15 may be arranged at the opposite direction as illustrated in the Figures. This means, the centering protrusion 15 may be arranged at the inner surface of the outer cylinder 9, in particular also inside of the gap between the outer cylinder 9 and the inner cylinder 10. The centering protrusion may be formed as a protrusion extending circumferentially along the cylinder and/or they may formed as non-continuous, intermittent protrusion.

Figure 3:
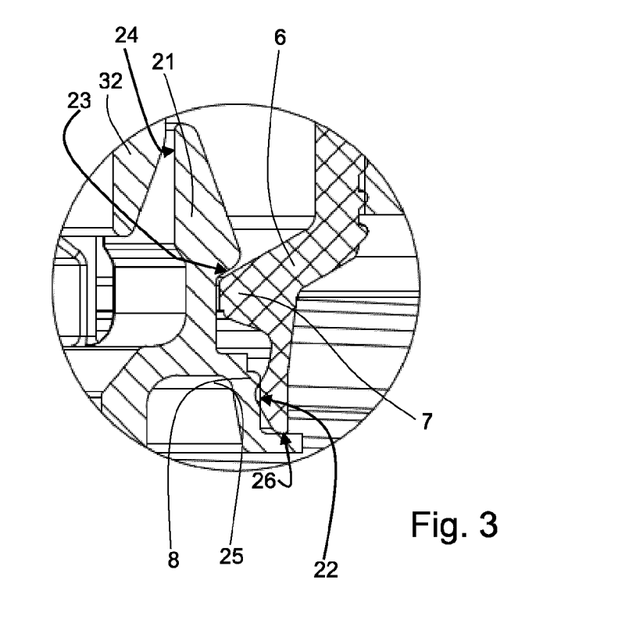

FIG. 3 shows a focused view of the receiving arrangement 6 and the therewith engaged hook elements 21 of the sealing element 20 from the focus window 200 of FIG. 2B. On the basis of FIG. 3 it can be clearly seen that the receiving arrangement 6 of the closing element 1, formed as the tampering section 12 of the inner cylinder 10, is in the sealed state of the closing device 100, as shown here, in contact with the sealing element 20 via at least three disjunctive surfaces. The sealing surface 22 of the sealing element 20 is in particular in contact with the sealing protrusion 8 via a full angle of 360 degrees, such that an extremely tight closure of the fluid channel 2 is guaranteed. Additionally, the lower end of the inner cylinder 10 and as well the lower end of the sealing protrusion 8 is in contact with an outer ring section 25 of the sealing element 20, which ring section 25 comprises a L-shaped cross section, via a stop area 26, which encompasses the sealing protrusion 8 on the underside (i.e. on the side of the input opening 3). This engagement prevents that the sealing element 20 can be moved into the direction of the output opening 4 for separating it from the closing element 1.

On the opposing side, i.e. into the direction of the output opening 4, the plurality of hook elements 21 encompass, the latching nose 7 of the receiving arrangement 6, which is formed as a ring and is extending over the complete circumference of the inner cylinder 10, and therefore prevent an undesired disengagement of the sealing element 20 from the closing element 1. The hook elements 21 rest on the contact area 23 of the latching nose 7. In the opened state of the closing device 100 the hook elements 21 can be folded radially inwardly with the help of an opening arrangement, not shown here, such that they are disengaged with the latching nose 7 but get engaged with a connecting piece of the opening arrangement. The sealing element 20 can also be moved into the direction of the input opening 3 and can be separated from the closing element 1 by an axial movement of the connecting piece of the opening arrangement into the direction of the input opening 3.

The engagement of the sealing element 20 and the receiving arrangement 6 in the sealed and closed state as shown in FIGS. 2A, 2B and 3 can be additionally strengthen by the bar 32 of the closing cap 30, extending in the output opening 4. This bar 32 is in contact with the hook element 21 via the contact area 24 of the hook element 21 and thereby prevents a radial inward folding of the hook element 21, such that in the closed and sealed state as shown here an inwardly folding of the hook elements 21 and therefore a loosening of the sealing element 20 from the closing element 1 is impossible.

As can be seen in the FIGS. 2A and 2B, the closing cap 30 comprises a sealing olive 31 directed radially outward, which provides a connection as tight as possible between the closing cap 30 and the closing element 1. In the embodiment as shown here, the closing cap 30 comprises a cap lid 33 which is detachably connected via rippable bars 34 to a cap casing 35, which is unlosable connected to the closing element 1, such that the closing cap 30 can be opened by a user pulling the cap lid 33 off the closing element 1 and thereby releases the output opening 4.

Figure 5:
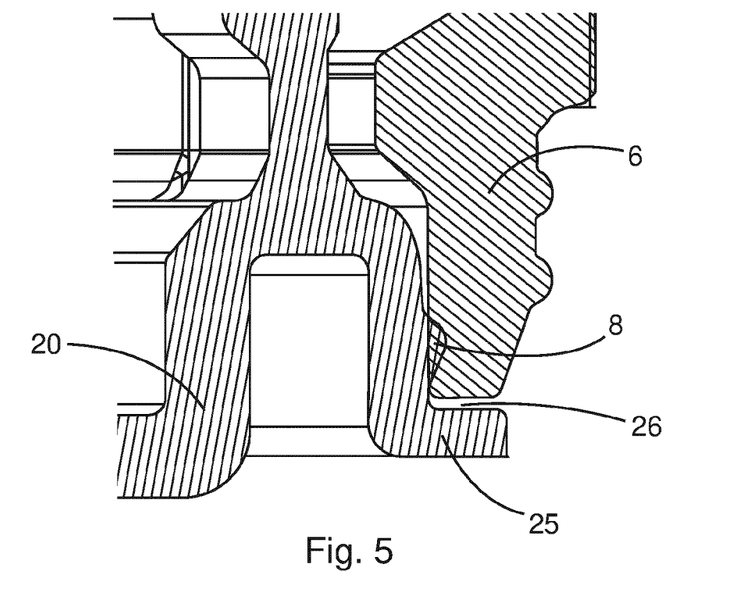

As can be seen FIG. 5, the sealing element 20 comprises a protrusion 8, which can extend along the sealing element, in particular extend circumferentially along the sealing element. The receiving arrangement 6 abuts at the stop area 26 of the sealing element 20, such that a sealed contact between these two elements can be provided. In this embodiment, the sealing element comprises an outer ring section 25 extending in a direction away from the closing axis 50, which comprises an L-shaped cross section. According to another embodiment, the sealing element 20 may comprise more than one protrusion, wherein a plurality of protrusions, for example at least two protrusions instead of one protrusion, may comprise a radius which is smaller than a radius of a single protrusion.

Figure 6:
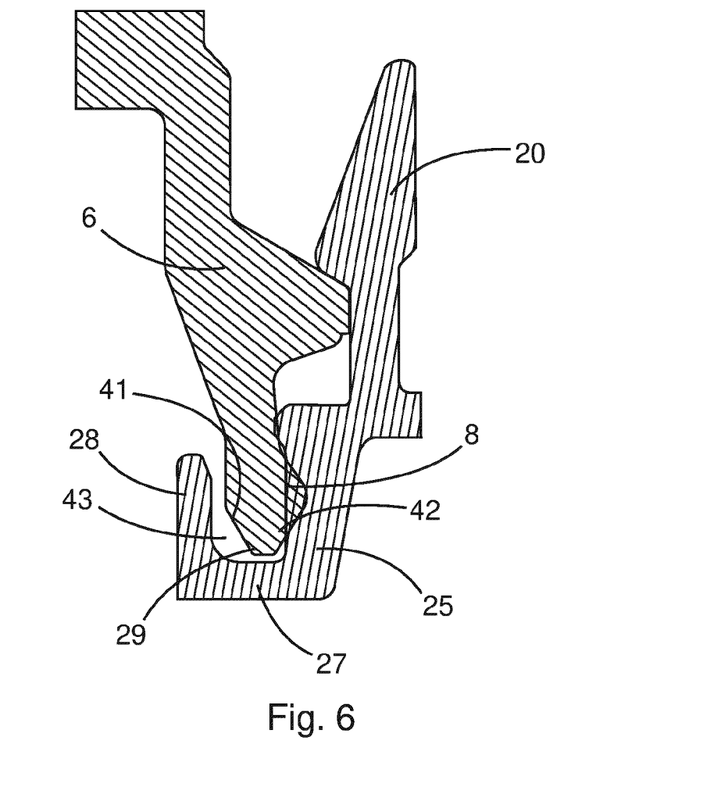

As can be seen FIG. 6, the protrusion 8 is arranged at the receiving element. Further, it can be seen that the sealing element 20 comprises an outer ring section 25 extending in a direction away from the closing axis 50, which comprises a U-shaped cross section, wherein the U-shaped cross section partially surrounds the receiving arrangement 6 on the side of the input opening 3. A first part 27 of the U-shaped cross section extends from a lower end of the sealing element 20 in a direction away from the closing axis 50 and a second part 28 of the U-shaped cross section extends along the closing axis 50 in the direction of the output opening for partially forming the U-shape. Between the first part 27 and the second part 28 of the U-shaped cross section a space 43 is formed for partially accommodating the receiving arrangement 6 on the side of the input opening. The space 43 between the first part 27 and the second part 28 of the U-shaped cross section is large enough such that the receiving arrangement can be inserted, and small enough that a snap fit connection may be formed. In FIG. 6, it can be seen that the receiving arrangement 6 comprises a stop area 29, which is arranged vertically to the closing axis, wherein the stop area 29 is arranged at an end of the receiving arrangement, which end extends into the direction of the input opening 3.

Figure 7:
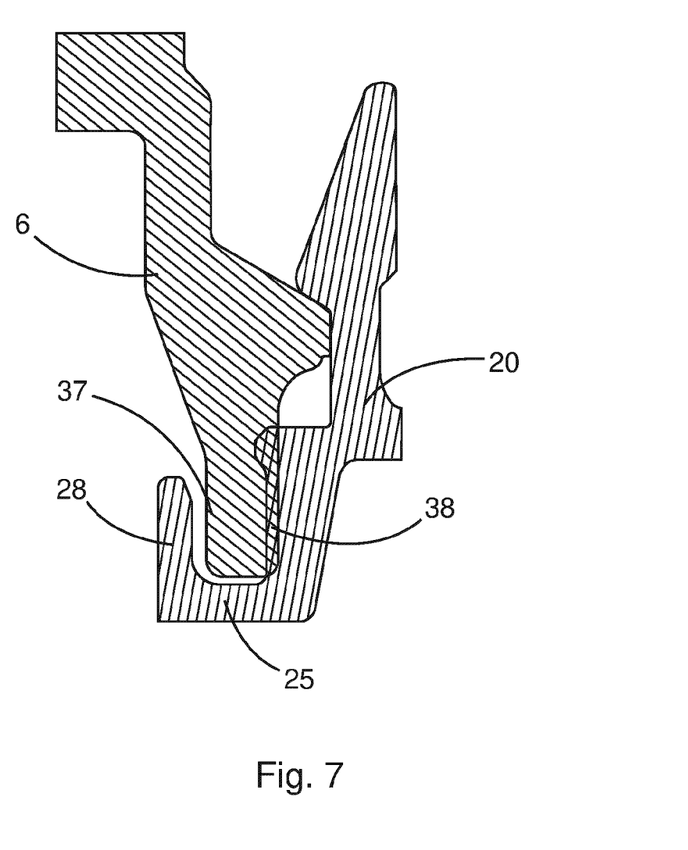

As can be seen in FIG. 6 the receiving arrangement 6 comprises a first chamfer 41 arranged between the first side wall (the side walls are illustrated in FIG. 7 below) and the stop area, and/or further comprises a second chamfer 42 arranged between the second side wall and the stop area.

FIG. 7 shows an embodiment of the invention, wherein the end of the receiving arrangement 6 comprises a first side wall 37 and a second side wall 38, which both extend parallel to each other along the closing axis 50 from the stop area 29 into the direction of the output opening 4. According to this embodiment, a protrusion can be formed either at the receiving arrangement 6 or at the sealing element 20, or the protrusion might be omitted. The receiving arrangement 6 having the first and second side wall, extending parallel, might fit exactly into the gap 43 of the U-shaped cross section of the sealing element in such a manner that the first side wall 37 might abuts at the second part of the U-shaped cross section and the second side wall 38 might abut at the wall of sealing element 20 forming a third part of the U-shaped cross section. Whereas the invention has been shown and described in detail in the drawings and the preceding description, this illustration and description is merely illustrative and is not intended to limit the scope of protection as defined by the claims. The invention is not limited to the disclosed embodiments.

Variations of the disclosed embodiments will be obvious to those skilled in the art from the drawings, description, and appended claims. It should be noted that the term "comprising" does not exclude other elements or steps and "a" or "an" does not exclude a plurality. The mere fact that certain features are claimed in different claims does not preclude their combination. Reference signs in the claims should not be construed as limiting the scope of the claims.

LIST OF REFERENCE SIGNS 1 closing element
2 fluid channel
3 input opening
4 output opening
5 first fastener (here: internal thread)
6 receiving arrangement
7 latching nose
8 sealing protrusion
9 outer cylinder
10 inner cylinder
11 normal section
12 tapering section
13 second fastener (here: further latching nose)
14 flex band
15 centering protrusion
16 flange
20 sealing element
21 hook element
22 sealing area
23 contact area
24 abutment area
25 ring section
26 stop area
27 first part of the U-shape cross section
28 second part of the U-shape cross section
29 stop area of the receiving arrangement
30 closing cap
31 sealing olive
32 bar
33 cap lid
34 ripable bar
35 cap casing
36 actuation flap
37 first side wall
38 second side wall
40 grip riffle
41 first chamfer
42 second chamfer
43 space
50 closing axis
51 Line B-B
52 Line A-A
100 closing device
200 focus window

The invention claimed is:

1. A closing device comprising a closing element, a sealing element and a closing cap,
wherein the closing element comprises a fluid channel having an input opening and an output opening,
wherein the fluid channel is aligned along a closing axis,
wherein the closing element comprises a first fastener,
wherein the first fastener is configured and arranged in such a manner, that the closing element is connectable at least form-fitted or force-fitted with a neck of a container, such that a filling material inside the container is guidable into the fluid channel through the input opening,
wherein the closing element comprises a receiving arrangement for receiving the sealing element,
wherein the receiving arrangement comprises a latching nose projecting to the closing axis or a latching recess directed away from the closing axis for at least form-fit or force-fit connecting of the closing element with the sealing element,
wherein the closing element and the sealing element are configured in such a manner, that in a sealed state of the closing device the sealing element is engaged with the receiving arrangement and the sealing element seals the fluid channel at least liquid-tight, and in an unsealed state of the closing device, the sealing element is disengaged with the receiving arrangement,
wherein the closing element and the closing cap are configured and arranged in such a manner, that the closing device can be brought in a closed state, in which the closing cap closes output opening, and can be brought in an opened state, in which the output opening is released, characterized in that, a sealing protrusion is located at least at one of the receiving arrangement, and the sealing element,
wherein the sealing protrusion is arranged at a sealing area between the receiving arrangement and the sealing element, such that in a scaled state of the closing device the sealing protrusion abuts on the sealing area between the receiving arrangement and the sealing element for at least liquid-tightly sealing the fluid channel,
wherein the receiving arrangement comprises the sealing protrusion axially spaced apart from the latching nose or the latching recess,
wherein the sealing protrusion projects into the direction of the closing axis,
wherein the sealing protrusion and the sealing element are configured in such a manner, that the sealing protrusion in the sealed state of the closing device abuts on a sealing area of the sealing element for at least liquid-tight sealing the fluid channel,
wherein the sealing element comprises an outer ring section extending in a direction away from the closing axis, which comprises an U-shaped cross section,
wherein the U-shaped cross section partially surrounds the receiving arrangement on the side of the input opening,
wherein a first part of the U-shaped cross section extends from a lower end of the sealing element in a direction away from the closing axis and a second part of the U-shaped cross section extends along the closing axis in the direction of the output opening for partially forming the U-shape, and
wherein between the first part and the second part of the U-shaped cross section a space is formed for partially accommodating the receiving arrangement on the side of the input opening.

2. The closing device according to claim 1, wherein the receiving arrangement is formed flexible at least in sections in such a manner and the sealing element is configured in such a manner, such that the sealing protrusion abuts in the sealed state of the closing device at the sealing area under tension.

3. The closing device according to claim 1,
wherein the sealing element comprises the sealing protrusion,
wherein the sealing protrusion extends away from the closing axis,
wherein the sealing protrusion and the receiving arrangement are arranged at a sealing area of the receiving arrangement, such that the sealing protrusion in the sealed state of the closing device abuts on the sealing area of the receiving arrangement for at least liquid-tight sealing the fluid channel.

4. The closing device according to claim 1,
wherein the receiving arrangement is formed flexible at least in sections in such a manner and the sealing element is configured in such a manner, that the sealing protrusion extends in the sealed state to an inner radius, which is larger as the one inner radius to which the sealing protrusion extends in the unsealed state, such that the sealing protrusion abuts in the sealed state of the closing device at the sealing element under tension.

5. The closing device according to claim 1,
wherein the receiving arrangement is formed flexible at least in sections in such a manner and the sealing element is configured in such a manner, that the sealing protrusion at the sealing element extends in the sealed state to an outer radius of the sealing element which is larger than an inner radius of the receiving arrangement, such that the sealing protrusion abuts in the sealed state of the closing device at the receiving arrangement under tension.

6. The closing device according to claim 1,
wherein the receiving arrangement comprises at least a latching nose projecting to the closing axis, wherein the latching nose extends to a first inner radius and the sealing protrusion extends to a second inner radius, wherein the first inner radius is smaller than the second inner radius.

7. The closing device according to claim 1, wherein the sealing protrusion extends annular over a circumference angle of 360 degrees.

8. The closing device according to claim 1,
wherein the latching nose or the latching recess on the one hand and the sealing protrusion on the other hand are connected with each other via a wall section extending in axial direction,
wherein the wall section comprises a lower thickness, to be measured radially to the closing axis, than the sealing protrusion.

9. The closing device according to claim 1,
wherein the receiving arrangement comprises a sealing olive, wherein the sealing olive comprises the sealing protrusion and a stem section joining the sealing protrusion in axial direction of the output opening, wherein the stem section comprises a lower thickness, to be measured radially to the closing axis, than the sealing protrusion.

10. The closing device according to claim 1,
wherein the sealing protrusion comprises a substantially semicircular cross section.

11. The closing device according to claim 1,
wherein the closing element comprises an outer cylinder and an inner cylinder, wherein the inner cylinder comprises a smaller maximum inner diameter than the outer cylinder,
wherein the inner cylinder is at least arranged in sections inside of a channel area, which is surrounded by the outer cylinder,
wherein the receiving arrangement is arranged at the inner cylinder.

12. The closing device according to claim 11, wherein the inner cylinder comprises a normal section and a tapering section,
wherein the normal section comprises a larger inner diameter than the tapering section,
wherein the tapering section is arranged closer to the input opening than the normal section,
wherein the receiving arrangement is arranged at least in sections on the tapering section.

13. The closing device according to claim 1,
wherein the closing element comprises a second fastener,
wherein the second fastener is configured and arranged in such a manner, that the closing element is connectable form-fit or force-fit to the output opening with an opening arrangement configured for separating the sealing element.

14. The closing device according to claim 1,
wherein the receiving arrangement and the sealing element are configured in such a manner, that in a sealed state of the closing device the sealing element engaged with the latching nose or the latching recess is only disengageable with the latching nose or the latching recess via an axial motion into direction of the input opening, in order to achieve the unsealed state of the closing device.

15. The closing device according to claim 1,
wherein the sealing element comprises a substantially circular sealing plate and at least one hook element extending in the sealed state of the closing device from the sealing plate into the direction of the output opening, wherein the at least one hook element is engaged, in the sealed state of the closing device, with the latching nose or the latching recess of the closing element.

16. The closing device according to claim 15,
wherein the closing cap comprises, in a closed state of the closing device, a bar extending into the output opening, which in a sealed state of the closing device abuts or is abutable at least in sections on the at least one hook element of the sealing element.

17. The closing device according to claim 1,
wherein the receiving arrangement comprises a stop area which is arranged vertically to the closing axis, wherein the stop area is arranged at an end of the receiving arrangement, which end extends into the direction of the input opening,
wherein the end of the receiving arrangement comprises a first side wall and a second side wall, which both extend parallel to each other along the closing axis from the stop area into the direction of the output opening.

18. The closing device according to claim 17, further comprising a first chamfer arranged between the first side wall and the stop area, and/or a second chamfer arranged between the second side wall and the stop area.

19. The closing device according to claim 1, wherein the closing device comprises an opening arrangement separable from the closing element, wherein the opening arrangement comprises a connecting element and a pouring spout defining a pouring channel, wherein the connecting element is engageable form-fitted or force-fitted with the closing element for connecting die opening arrangement with the closing element, wherein the opening arrangement and the closing element are configured in such a manner, that by an engaging of the opening arrangement and the closing element engaged with the pouring spout a fluid connection is providable between the inside and the outside of the container via the pouring channel of the opening arrangement, wherein the opening arrangement and the closing element are configured in such a manner, that the pouring spout is movable along the closing axis and relative to the connecting element, if the opening arrangement is connected with the closing element and the output opening is released, wherein the opening arrangement, the closing element and the sealing element are configured in such a manner, that after an axial opening movement of the pouring spout into the direction of the input opening of the closing element, the sealing element is separated from the closing element and connected with the pouring spout, such that the closing device is in the unsealed state, and a fluid connection is provided between the inside of the container and the outside of the container.

* * * * *